United States Patent [19]

Genssler et al.

[11] Patent Number: 4,655,413

[45] Date of Patent: Apr. 7, 1987

[54] APPARATUS FOR IMPROVING AERODYNAMIC FLOW CONDITIONS AT THE AIR INTAKE OF GAS TURBINE ENGINES

[75] Inventors: Hans-Peter Genssler, Munich; Kurt Lotter, Riemerling, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 704,068

[22] Filed: Feb. 21, 1985

[30] Foreign Application Priority Data

Feb. 28, 1984 [DE] Fed. Rep. of Germany ....... 3407137

[51] Int. Cl.$^4$ ............................................. B64D 33/02
[52] U.S. Cl. .................................. 244/53 B; 137/15.1
[58] Field of Search .............. 244/53 B, 53 R; 55/306, 55/307; 137/15.1

[56] References Cited

U.S. PATENT DOCUMENTS

| | | | |
|---|---|---|---|
| 3,489,377 | 1/1970 | Pearson et al. | 244/53 B |
| 3,659,424 | 5/1972 | Polk | 244/53 B |
| 4,121,606 | 10/1978 | Holland et al. | 244/53 B |
| 4,245,803 | 1/1981 | DeBlois | 244/53 B |
| 4,307,743 | 12/1981 | Dunn | 244/53 B |
| 4,418,879 | 12/1983 | Vanderleest | 244/53 B |
| 4,463,772 | 8/1984 | Ball | 244/53 B |

FOREIGN PATENT DOCUMENTS 2914469 10/1980 Fed. Rep. of Germany .

*Primary Examiner*—Galen Barefoot
*Assistant Examiner*—Lynn M. Fiorito
*Attorney, Agent, or Firm*—W. G. Fasse; D. H. Kane, Jr.

[57] ABSTRACT

Aerodynamic flow conditions at the air intake of gas turbine engines, especially aircraft engines, comprising boundary layer deflectors are improved by movably arranging the boundary layer deflectors so that they may be retracted flush into the aircraft fuselage during take-off and low speed flight, and may be extended to an operating position during high speed flight. A similar retractable boundary layer deflector may be provided for an air intake for an auxiliary engine, which operates intermittently to drive auxiliary devices of an aircraft. When the auxiliary engine operates the air intake is open and the deflector is extended thereby improving the intake air flow conditions. When the auxiliary engine is shut down, the air intake is covered by a control flap and the deflector is retracted flush into the fuselage. These features provide optimal high- and low-speed flow conditions at the air intakes of the primary propulsion plant and of the auxiliary engine of an aircraft, and undesirable drag is eliminated or at least substantially reduced.

10 Claims, 13 Drawing Figures

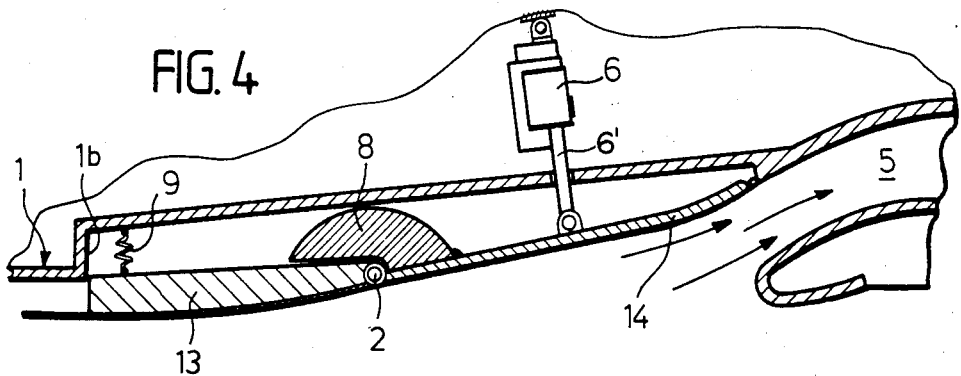
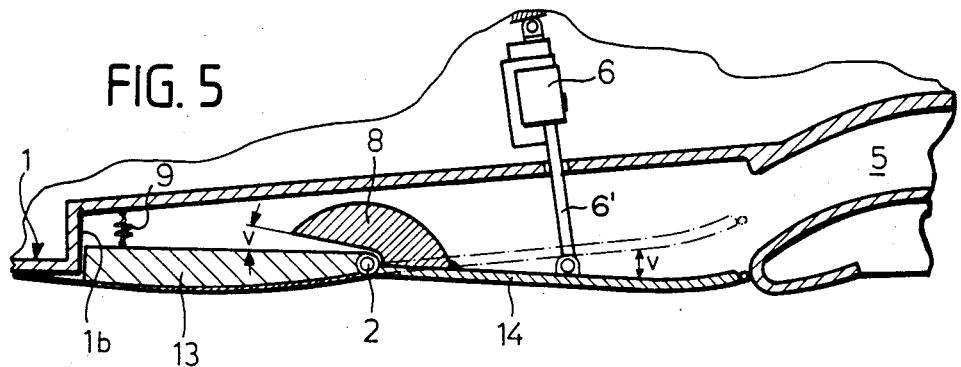
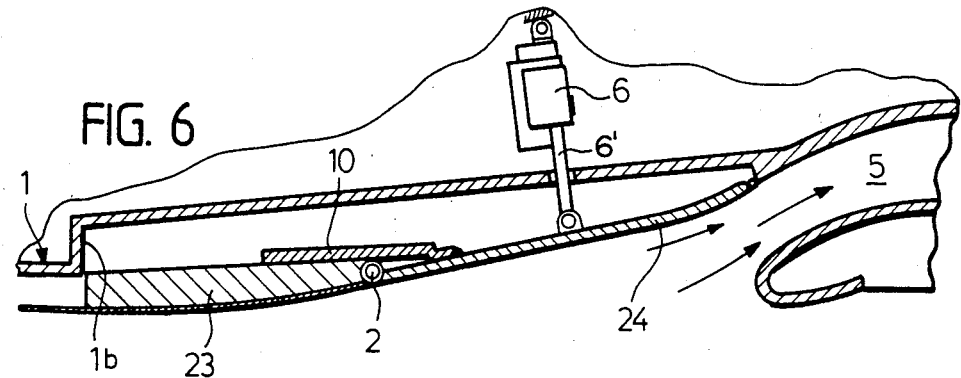
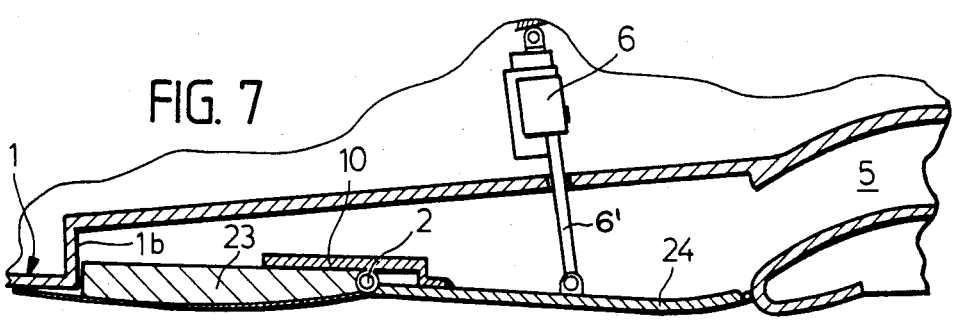

APPARATUS FOR IMPROVING AERODYNAMIC FLOW CONDITIONS AT THE AIR INTAKE OF GAS TURBINE ENGINES

FIELD OF THE INVENTION

The invention relates to an apparatus for improving the aerodynamic flow conditions at air intakes comprising boundary layer separators or deflectors for gas turbine engines, especially installed in an aircraft. Furthermore, the invention relates to an air intake arrangement for improving the aerodynamic flow conditions of an air intake of an auxiliary gas turbine engine which operates intermittently to drive auxiliary devices of an aircraft. Such an air intake arrangement is regulated or controlled by a flap which is pivotally or movably connected to the aircraft frame or fuselage. When the auxiliary engine is operating, the flap opens or uncovers the air intake, however, when the auxiliary engine does not work the flap closes or covers the air intake.

DESCRIPTION OF THE PRIOR ART

A flap arrangement of the above described type for an auxiliary gas turbine engine is known from German Patent Publication (DE-OS) 2,914,469.

Aircraft which operate at high speeds, especially in the supersonic range, are equipped with air intakes comprising boundary layer deflectors or so-called boundary layer plows which bridge a certain spacing, the boundary layer gap, between the aircraft fuselage and the inner side of the air intake duct. The purpose of the boundary deflector is to avoid that the boundary layer which causes turbulence and disrupts the air flow near the aircraft fuselage, is taken into the air intake duct.

An air intake of the aircraft must convert as much as possible of the kinetic energy of the imcoming air stream into compression energy, by reducing the air stream velocity. This energy recovery or recuperation is especially important at high mach number air speeds because the energy recovery may be substantial. In order to optimize this energy recovery, the collected and compressed air must be delivered to the engine in a homogeneous state in properly dosed quantities, and with as little loss as possible. Such air flow regulation is necessary for the air intake and engine to work together in an aerodynamically stable manner.

During take-off and at relatively low flight speeds, the air intake diameter or cross-sectional area must be as large as possible in order to avoid air flow separation or delamination at the air intake leading edges or lips. The intake area may also be enlarged by means of auxiliary intake doors or flaps for this purpose.

OBJECTS OF THE INVENTION

In view of the foregoing it is the aim of the invention to achieve the following objects singly or in combination:

to construct the air intake of aircraft, especially suitable for supersonic flight, so that the cross-sectional flow area is as large as possible for take-off and at relatively low flight speeds;

to provide means for bypassing the fuselage boundary layer from the intake at high speeds and to arrange the bypass so that is increases the air intake surface area during take-off and low speeds; and to provide an adjustable boundary layer deflector and a movable cover for an auxiliary engine air intake, whereby the deflector and cover lie aerodynamically flush against the aircraft fuselage when the auxiliary engine is off, and provide optimal intake air flow conditions when the auxiliary engine is operating.

SUMMARY OF THE INVENTION

The above objects have been achieved in an apparatus for improving the aerodynamic flow conditions around air intakes of gas turbine engines in an aircraft, according to the invention, wherein the boundary layer deflector is extendable and retractable relative to the aircraft fuselage, whereby the deflector means are retracted flush into the fuselage when the aircraft is on the ground or flying at relatively low speed, while at relatively high flight speeds, the deflector means is extended into its operating position.

Due to the retraction of the boundary layer deflector according to the invention, into the fuselage so that it lies essentially flush with the outer fuselage surface, the air intake area may be enlarged by the size of the front surface of the boundary layer deflector during take-off and low speed flight. Furthermore, the invention provides, with an appropriate control or regulation, for the desired variation that is, a reduction of the scoop or air capture area of the air intake at supersonic flight speeds.

The invention also relates to a boundary layer deflector which is movably arranged in the aircraft fuselage, for cooperating with a flap controlled air intake for an intermittently operating auxiliary gas turbine engine. The deflector movement is dependent on the respective position of the air intake flap, so that the boundary layer deflector is extended out of the fuselage into an operating position when the air intake is open, and so that the deflector is retracted within the outer contours of the fuselage when the air intake is closed.

Through these features, it is ensured that the air intake operates with high efficiency when the engine or propulsion plant is operating, even at high flight speeds, and moreover, that the boundary layer deflector does not cause any aerodynamic drag when the auxiliary engine is not operating at which time the air intake of the auxiliary engine is also covered in an aerodynamically advantageous manner when the auxiliary engine is not operating. In other words, the boundary layer deflector which is extended at relatively high flight speeds, reduces the otherwise usual loss of power of the auxiliary gas turbine engine at high flight altitudes. Also, restarting of the auxiliary engine, for example to take over the drive of auxiliary equipment and control systems upon failure of a main or propulsion engine, is facilitated by the pressure gain due to bypassing the detrimental boundary layer away from the air intake.

According to an embodiment of the invention, the boundary layer deflector is of a flap-type construction, and is hinged at its rear edge to a cross-wise shaft secured to the aircraft frame or fuselage.

In a further embodiment of the invention, the air intake flap is hinged at its front or leading edge to the same cross-wise shaft provided for the boundary layer deflector.

One possibility of corrdinating the position adjustment movements of the air intake flap with the position adjustment movements of the boundary layer deflector, in the sense of the invention, is a mechanical coupling of the drives, between the air intake flap and the boundary layer deflector. Such mechanical coupling means may, for example, take the form of a lever system such as quadrilateral lever system, a push-cam, or a splice strap or tongue plate.

BRIEF DESCRIPTION OF THE DRAWINGS

In order that the invention may be clearly understood it will now be described by way of example, with reference to the accompanying drawings, wherein:

FIG. 4 is a view similar to FIG. 2, but showing a modified embodiment of the deflector and flap control;

FIG. 5 is a view similar to FIG. 3, and showing the deflector and flap control of FIG. 4 in the closed position;

FIG. 6 is a view similar to FIG. 2, but showing a further embodiment of a deflector and flap control;

FIG. 7 is a view similar to FIG. 3, and showing the deflector and flap control of FIG. 6 in the closed position;

DETAILED DESCRIPTION OF PREFERRED EXAMPLE EMBODIMENTS AND OF THE BEST MODE OF THE INVENTION

Figure 1:
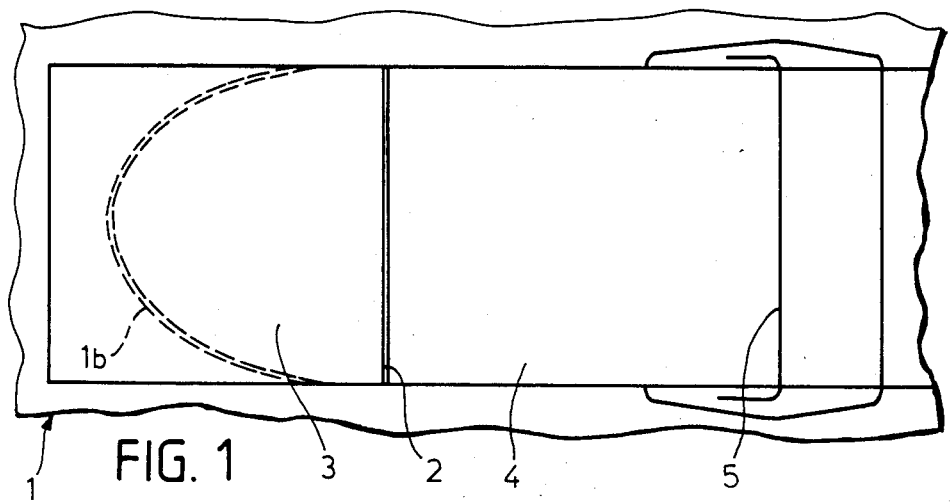
FIG. 1 is a bottom view of an adjustable boundary layer deflector mounted on the underside of an aircraft, in front of or upstream of a flap controlled air intake for an auxiliary gas turbine engine.
Figure 2:
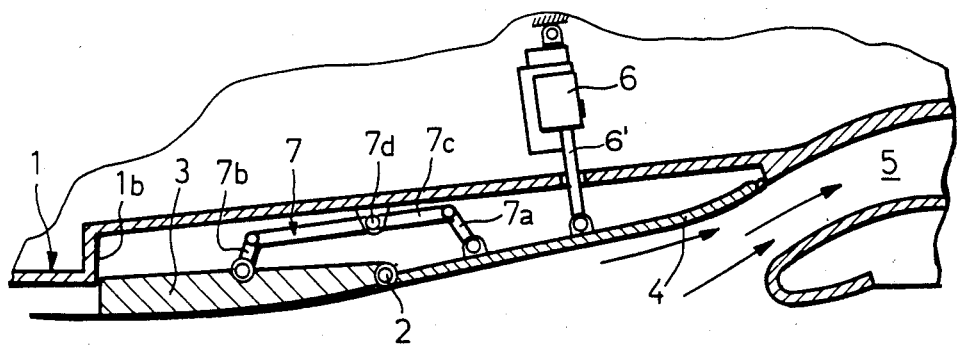
FIG. 2 is a sectional side view of an embodiment of the deflector and flap controlled air intake shown in FIG. 1, with components extended in the operating or auxiliary engine-on position.
Figure 3:
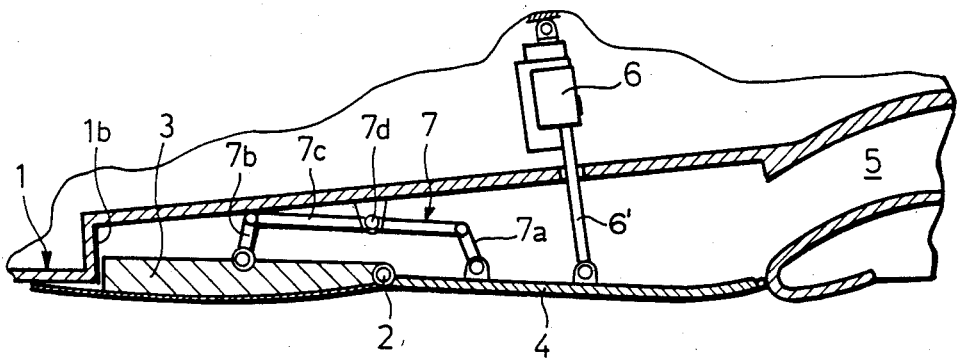
FIG. 3 is a view as in FIG. 2, but with the components retracted in the closed or auxiliary engine-off position.

As is shown in FIGS. 1 to 3, a forwardly located boundary layer deflector 3 is movably attached to the aircraft fuselage 1 by an axle or hinge 2. A flap 4 located in the flow direction, from left to right, behind the deflector 3 is also journalled to the same hinge 2. The flap 4 controls an air intake 5 for an auxiliary gas turbine engine, which is not shown. FIG. 2 shows the air intake flap 4 in the open position and the boundary layer deflector 3 in the extended position, that is, in the operating position. However, in FIG. 3, the flap 4 covers or closes the air intake 5, and the boundary layer deflector 3 is retracted into a niche or recess 1b in the aircraft fuselage 1. The drive for the flap 4 and for the deflector 3 is achieved by a servomotor 6, which engages the air intake flap 4 with a pushrod 6' journalled to the inside of the flap 4. The flap 4 is operatively connected to the boundary layer deflector 3 by means of a coupling drive 7, such as a quadrilateral bell crank drive 7, comprising a crank 7a attached by a pivot axle to the flap 4, a push or coupling rod 7b hinged to the deflector 3, and a rocker arm 7c which is tiltably connected to the fuselage 1 at a fulcrum journal 7d.

As is shown in FIGS. 4 and 5, a drive cam 8 is rigidly attached to the front edge, as viewed in the flow direction, of the air intake flap 14. When the air intake 5 is to be opened, the flap 14 is retracted by the servomotor 6. After the flap 14 retracts through a short free opening distance or angle, the cam 8 contacts the boundary layer deflector 13, and as the flap 14 is retracted further for opening the air intake 5, the cam 8 drives the deflector 13 to its extended or protruding operating position. The drive force applied by the cam 8 must overcome the retraction force of a return spring 9. When the flap 14 is extended to close the air intake 5, the force of the return spring 9 retracts the deflector 13 into the recess 1b of the fuselage 1.

FIGS. 6 and 7 show a relatively rigid connection between the air intake flap 24 and the boundary layer deflector 23. This rigid connection is achieved by means of a splice strap or tongue plate 10, which is rigidly connected to the front edge of the flap 24 as viewed in the flow direction. The tongue plate 10 bridges the common hinge 2 and is attached to the rear edge of the deflector 23. The tongue plate 10 allows some bending elasticity, but serves to extend or retract the deflector 23 in response to a respective opening or closing of the flap 24, much as if the deflector 23 and flap 24 essentially form a single component journalled at the hinge 2.

Figure 8:
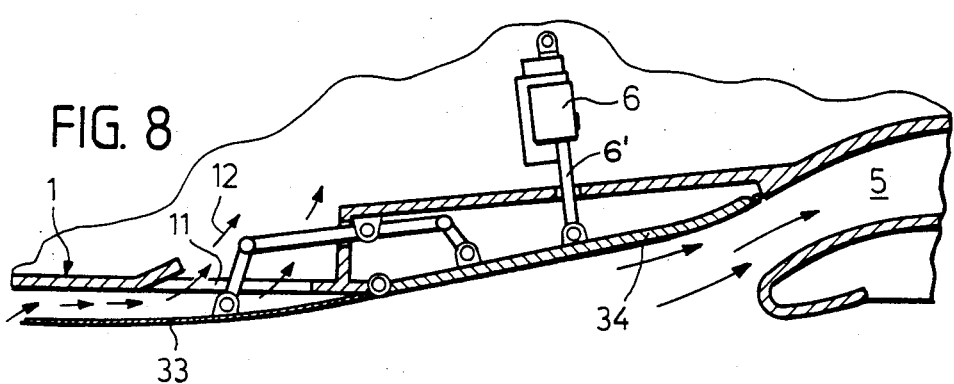
FIG. 8 is a view similar to FIG. 2, but of an embodiment providing an additional airstream opening.
Figure 9:
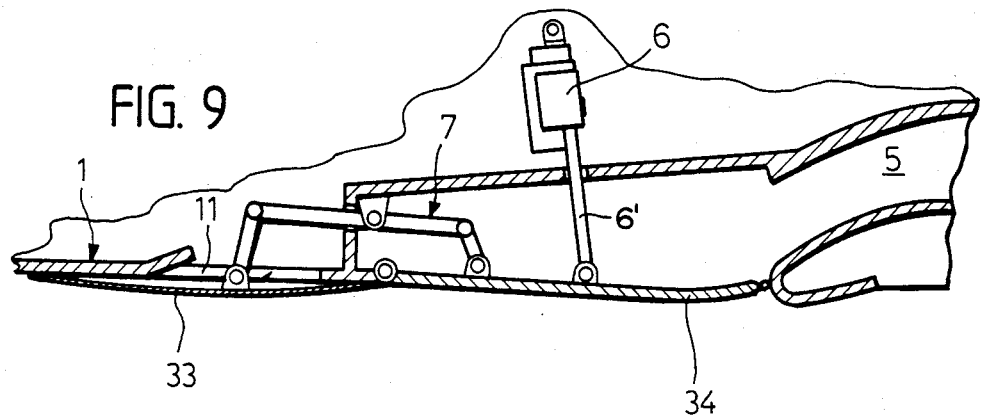
FIG. 9 is a view similar to FIG. 3, but of the embodiment of FIG. 8.

According to FIGS. 8 and 9, the air intake flap 34 and the boundary layer deflector 33 are driven and controlled substantially in the same manner as the flap 4 and deflector 3 in FIGS. 2 and 3. However, in FIGS. 8 and 9 the deflector 33, in its open or extended position, also serves as an air scoop to guide required air 12 into an additional air stream opening 11. The deflector 33 controls the flow 12 of use air through the opening 11 in the fuselage 1. However, when the air intake flap 34 is closed as shown in FIG. 9 the deflector 33 also closes the air stream opening 11.

Figure 10:
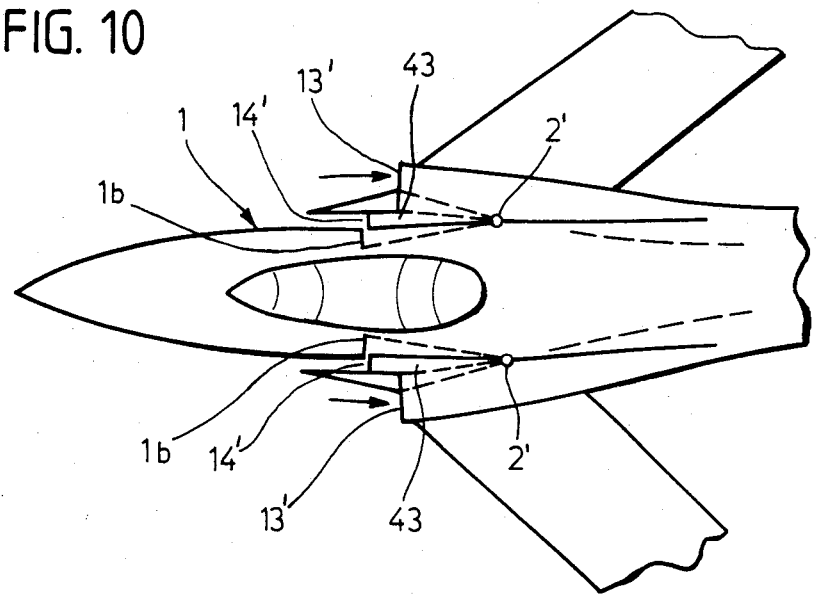
FIG. 10 is a top view of an aircraft equipped with side-mounted, vertically arranged supersonic air intakes comprising external compression surfaces for the main or propulsion engine with adjustable boundary layer deflectors extended into the high speed operating condition.
Figure 11:
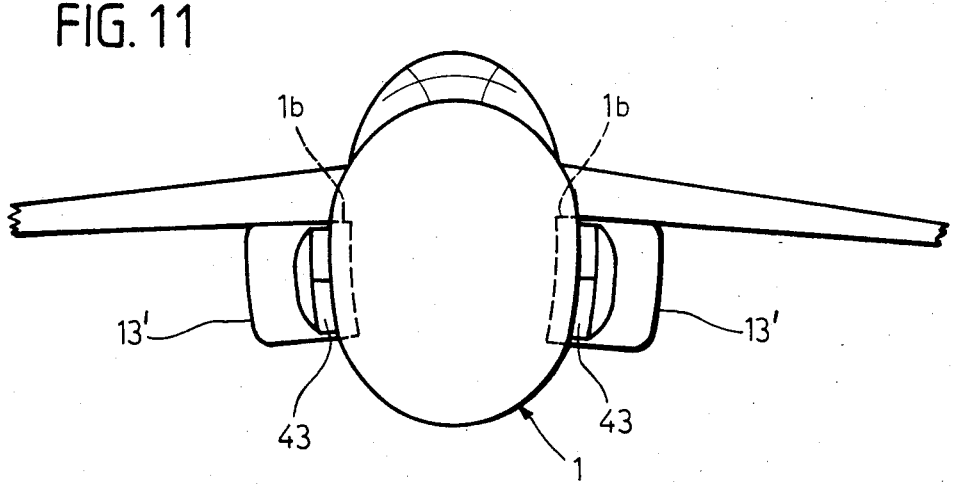
FIG. 11 is a front view of the aircraft shown in FIG. 10.

FIGS. 10 to 13 show the front portion of a high-performance aircraft equipped with two side-mounted supersonic air intakes 13', each comprising a boundary layer deflector 43 tiltably attached at its rear edge to the aircraft fuselage 1 by a respective hinge 2'. The aircraft shown in FIGS. 10 and 11 is in supersonic flight, with the boundary layer deflectors 43 extended out of the fuselage recesses 1b, whereby the deflectors 43 each form a boundary layer gap 14' and function as a boundary layer plow to deflect the boundary layer away from the air intakes 13'.

Figure 12:
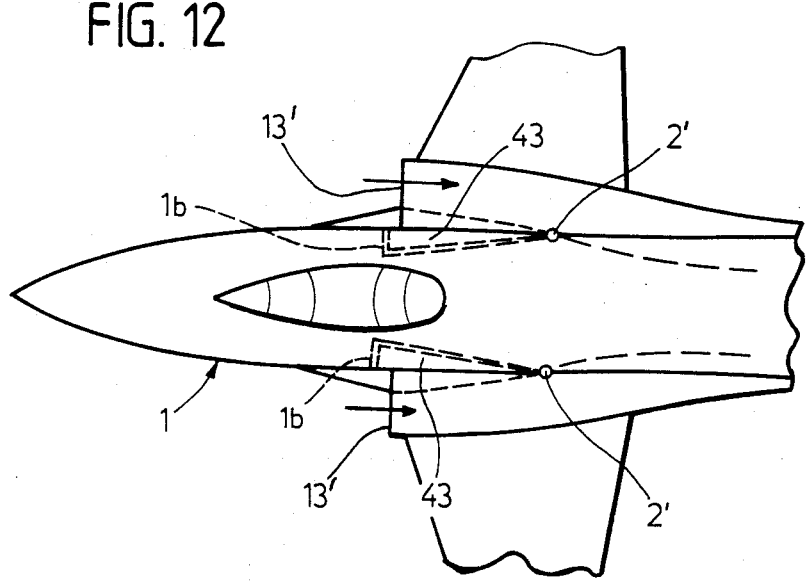
FIG. 12 is a top view similar to FIG. 10, but with the boundary layer deflector retracted for low speed flight or take-off.
Figure 13:
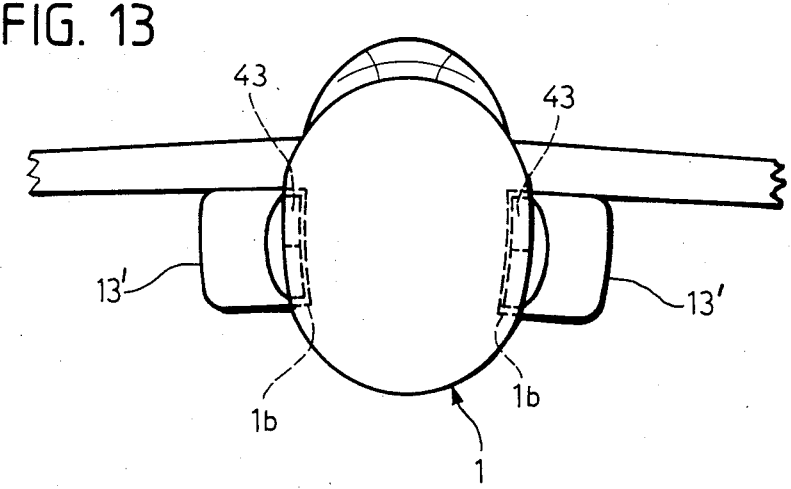
FIG. 13 is a front view of the aircraft shown in FIG. 12.

FIGS. 12 and 13 show the same aircraft during ground maneuvering, take-off, or low speed flight, whereby both boundary layer deflectors 43 are retracted into their resepective fuselage receses 1b in order to enlarge the air intake area of the air intakes 13'. FIG. 13 especially shows the enlarged air intake area compared to the air intake area apparent in FIG. 11. The enlargement corresponds to the frontal surface area of the deflector 43, i. e. the cross-sectional area of the boundary layer gap 14'.

Although the invention has been described with reference to specific example embodiments, it is to be understood, that it is intended to cover all modifications and equivalents within the scope of the appended claims.

We claim:

1. An apparatus for improving aerodynamic flow conditions at an air intake facing toward a flight direction for a gas turbine engine especially installed in an aircraft having a fuselage (1), comprising boundry layer deflector means opening toward said flight direction, a recess (1b) in said fuselage directly upstream of said air intake, wherein said boundary layer deflector means comprise an upstream edge facing toward said flight direction for peeling a boundary layer away from an air stream flowing into said air intake, said boundary layer deflector means further comprising a downstream end, hinging means (2, 2') for pivotably hinging said boundary layer deflector means exclusively at said downstream end thereof to said fuselage downstream of said air intake, operating means operatively connected to said boundary layer deflector means for moving said boundary layer deflector means into a retracted position in said recess in said fuselage so that the boundary layer deflector means are flush with an outer surface of said fuselage in this retracted position during ground maneuvers, take-off, or low speed flight of said aircraft when said air intake is fully opened, and for moving said boundary layer deflector means into an extended operating position during high speed flight of said aircraft when said air intake is at least partially opened for by-passing a detrimental boundary layer away from said air intake during said high speed flight.

2. The apparatus of claim 1, wherein said recess comprises an opening leading into said fuselage for guiding the boundary layer airflow as utility air through said opening into said fuselage when said boundary layer deflector means are in the extended position, said boundary layer deflector means covering said opening when said boundary layer deflector means are retracted into said recess.

3. An apparatus for improving aerodynamic flow conditions at an air intake of an auxiliary gas turbine engine operating intermittently for driving auxiliary equipment in an aircraft having a fuselage including a recess, comprising air intake flap means, hinge means pivotally connecting said air intake flap means to said fuselage, operating means connected to said air intake flap means for opening said air intake when said auxiliary gas turbine engine is operating and for closing said air intake when said auxiliary gas turbine engine is not operating, said apparatus further comprising boundary layer deflector means, means for movably supporting said boundary layer deflector means relative to said fuselage in a position upstream of said air intake as viewed in the flow direction for deflecting a detrimental boundry layer away from said air intake when said boundry layer deflector means are in an active position, and means for operating said boundary layer deflector means into said active position dependent on the respective position of said air intake flap means, whereby said boundary layer deflector means is extended to protrude from said fuselage in said active position only when said air intake flap means is positioned to open said air intake, and whereby said boundary layer deflector means is retracted into said recess of said fuselage when said air intake flap means is positioned to close said air intake.

4. The apparatus of claim 3, wherein said boundary layer deflector means comprise flap-type boundary layer deflectors each having a leading edge and a trailing edge and wherein said means for movably supporting said boundary layer deflector means comprise journal hinges attached to said fuselage for journalling said trailing edges of said flap-type boundary layer deflectors to said fuselage in such a position that said leading edge of said boundary layer deflectors is positioned upstream of said air intake.

5. The apparatus of claim 4, wherein said hinge means for said air intake flap means and said journal hinges for said flap-type boundary layer deflectors form a unitary hinge structure, said air intake flap means having a front edge connected to said unitary hinge structure to which said trialing edge of said flap-type boundary layer deflectors are connected.

6. The apparatus of claim 3, comprising mechanical drive coupling means for operatively coupling said operating means of said air intake flap means also to said boundary layer deflector means.

7. The apparatus of claim 6, wherein said mechanical drive coupling means comprise a quadrilateral bell crank mechanism including a fulcrum journal connected to said fuselage and rocker arm means pivotally connected to said fulcrum journal said operating means comprising drive means connected to one of said air intake flap means and said boundary layer deflector means for directly driving said one and indirectly driving the other of said air intake flap means and said boundary layer deflector means through said quadrilateral bell crank mechanism.

8. The apparatus of claim 6, wherein said air intake flap means have an opening angle larger than an opening angle of said boundary layer deflector means, and wherein said mechanical drive coupling means comprise a drive cam rigidly connected to a front edge of said air intake flap means, said operating means being connected to said air intake flap means for directly driving said air intake flap means whereby said drive cam is constructed for allowing a certain free opening angle of said air intake flap means for compensating for said larger opening angle, whereby said drive cam contacts said boundary layer deflector means after said air intake flap means have opened to some extent for then also driving said boundary layer deflector means into its open operating position as said air intake flap means continues to open with a greater opening angle, said apparatus further comprising return spring means connected to said boundary layer deflector means for applying a retracting force to said boundary layer deflector means to pull said boundary layer deflector means into a retracted position in said recess when said air intake is closed by said air intake flap means.

9. The apparatus of claim 6, wherein said mechanical drive coupling means comprise a relatively rigid tongue plate for operatively interconnecting said air intake flap means and said boundary layer deflector means.

10. The apparatus of claim 3, comprising an opening in said fuselage under said boundary layer deflector means through which a boundary layer air stream is deflected by said boundary layer deflector means as usable air stream when said boundary layer deflector means is extended into its operating position, and wherein said boundary layer deflector means closes said opening when said boundary layer deflector means is in a retracted position in said recess.

* * * * *